(12) United States Patent
Vinci

(10) Patent No.: US 10,907,112 B2
(45) Date of Patent: Feb. 2, 2021

(54) LUBRICANTS WITH IMPROVED SEAL COMPATIBILITY

(71) Applicant: The Lubrizol Corporation, Wickliffe, OH (US)

(72) Inventor: James N. Vinci, Mayfield Heights, OH (US)

(73) Assignee: The Lubrizol Corporation, Wickliffe, OH (US)

(*) Notice: Subject to any disclaimer, the term of this patent is extended or adjusted under 35 U.S.C. 154(b) by 0 days.

(21) Appl. No.: 14/350,869

(22) PCT Filed: Oct. 22, 2012

(86) PCT No.: PCT/US2012/061271
§ 371 (c)(1),
(2) Date: Apr. 10, 2014

(87) PCT Pub. No.: WO2013/062890
PCT Pub. Date: May 2, 2013

(65) Prior Publication Data
US 2014/0256606 A1     Sep. 11, 2014

Related U.S. Application Data

(60) Provisional application No. 61/552,122, filed on Oct. 27, 2011.

(51) Int. Cl.
| | | |
|---|---|---|
| C07F 5/04 | (2006.01) | |
| C10M 169/04 | (2006.01) | |
| C10M 133/44 | (2006.01) | |
| C10N 30/00 | (2006.01) | |
| C10N 40/04 | (2006.01) | |
| C10M 101/00 | (2006.01) | |

(52) U.S. Cl.
CPC ........ *C10M 133/44* (2013.01); *C10M 101/00* (2013.01); *C10M 2203/1006* (2013.01); *C10M 2203/1025* (2013.01); *C10M 2207/023* (2013.01); *C10M 2215/06* (2013.01); *C10M 2215/223* (2013.01); *C10M 2215/30* (2013.01); *C10N 2030/36* (2020.05); *C10N 2040/04* (2013.01)

(58) Field of Classification Search
CPC .............. C10M 133/44; C10M 133/46; C10M 2215/06; C10M 2207/023; C10M 2203/1025; C10M 2215/223; C10M 101/00; C10M 2215/30; C10M 2203/1006; C10N 2030/36; C10N 2040/04
USPC ....................................................... 508/280
See application file for complete search history.

(56) References Cited

U.S. PATENT DOCUMENTS

| | | | | |
|---|---|---|---|---|
| 4,734,209 A | * | 3/1988 | Phillips ................ | C07D 231/12 508/246 |
| 5,143,634 A | | 9/1992 | Quinga et al. | |
| 5,453,210 A | | 9/1995 | Bardasz et al. | |
| 5,487,839 A | | 1/1996 | Vinci et al. | |
| 5,849,677 A | * | 12/1998 | Romanelli ............ | C07C 319/02 508/322 |
| 6,074,992 A | * | 6/2000 | Levesque ............. | C10M 133/44 508/279 |
| 6,362,136 B1 | | 3/2002 | Richardson et al. | |
| 2007/0142247 A1 | * | 6/2007 | Baillargeon ......... | C10M 169/04 508/279 |
| 2008/0139426 A1 | * | 6/2008 | Hutchison ............ | C10M 133/44 508/279 |
| 2008/0200357 A1 | * | 8/2008 | Chasan ................ | C10M 141/12 508/186 |
| 2010/0099589 A1 | | 4/2010 | Ryan et al. | |

FOREIGN PATENT DOCUMENTS

| | | |
|---|---|---|
| CA | 2364200 A1 | 3/2003 |
| CN | 1299860 A | 6/2001 |
| CN | 1727458 A | 2/2006 |
| CN | 101851545 A | 10/2010 |
| CN | 102492525 A | 6/2012 |
| CN | 102627998 A | 8/2012 |
| EP | 0796908 A1 | 9/1997 |
| EP | 0976813 A1 | 2/2000 |
| EP | 1054052 A2 | 11/2000 |
| EP | 2428852 A1 | 3/2012 |
| GB | 1061904 A | 3/1967 |
| GB | 2444845 A | 6/2008 |
| WO | 2006110220 A1 | 10/2006 |
| WO | 2006136591 A1 | 12/2006 |
| WO | 2008095805 A2 | 8/2008 |

(Continued)

OTHER PUBLICATIONS

"Product Selection Guide for Lubricant Additives", BASF, Jan. 1, 2010, XP055047190, www.performancechemicals.basf.com/ev/internet/lubricants/en/function/conversions:/publish/content/lubricants/docs/Lubricant_Selection_Guide_HR.pdf., pp. 1-6.

(Continued)

*Primary Examiner* — Prem C Singh
*Assistant Examiner* — Francis C Campanell
(74) *Attorney, Agent, or Firm* — Iken Sans; Teresan Gilbert

(57) ABSTRACT

The present invention relates to industrial gear lubricating compositions that include a specific class of substituted triazoles, where the substituted triazole includes at least one hydrocarbyl group linked to one of the nitrogen atoms in the triazole ring. Such compositions provide surprisingly good seal compatibility compared to compositions with other triazoles and/or alternative additives.

6 Claims, No Drawings

(56) References Cited

FOREIGN PATENT DOCUMENTS

| WO | 2009045979 A1 | 4/2009 |
| WO | 2012047302 A2 | 4/2012 |
| WO | 2013062594 A1 | 5/2013 |

OTHER PUBLICATIONS

"Ciba Irgamet 39", www.resikem.com.ar/admin/archivos/tecnica/220/TDS_Irgamet_39.pdf, Jan. 1, 2005 XP055047188, pp. 1-6.
Alan R. Katritzky et al., "The Chemistry of Benzotriazole, Part 3. The Aminoalkylation of Benzotriazole", Journal of the Chemical Society, Perkin Transactions 1, Jan. 1, 1987, p. 799.
A. Shaut et al., "Effects of Irgamet 30 as Additive in Transformer Oil", Transactions on Dielectrics and Electrical Insulation, Service Center, Piscataway, NJ, US, vol. 19, No. 1, Feb. 1, 2012, pp. 175-180.
Rudnick, Leslie R.; "Lubricant Additives" CRC Press, 2009, 2nd Edition, pp. 19-21, 41, 216 and 621-624.
CAS entry for T551, Jun. 13, 2019, Registry No. 15497-45-7.
Tanee Chemical Ltd., "Sulfurized Isobutylene—T321—Tanee Lubricant Additives", Feb. 18, 2019, , p. 1/1.
China Academic Journals, "T321-Continuous Taking Chlorine Off Reaction Experiment in the Synthesis of Sulphide Isobutene", Jun. 21, 2019, p. 1 of 2.
Mang, Theo et al., "Lubricants and Lubrication", Wiley-VCH Verlag GmbH & Co KGaA, Second, Completely Revised and Extended Edition, 2007, pp. 114-117.
Keller, Robert, "Effects of Lubricants on Seal Elastomer", SAE Technical Paper Series 871626, 1987, pp. 1-23.
CAS entry for Irgamet 39, Jun. 13, 2019, Registry No. 80584-90-3.
Profilet, Rob, "Trends in Industrial Gear Oils", Lubrication 101, Reprint from Machinery Lubrication, Jan.-Feb. 2008, pp. 1-2.
Stepina et al., "Lubricants and Special Fluids", Elsevier, 1992, Tribology Series, 23, pp. 383-384.
Extracted pages from a Full Life Wind Turbine Gearbox Lubricating Fluids Project Report submitted to the United States Dept. of Energy by Dow Corning Corporation, DOE Award #DE-EE0001364, Feb. 2012, pp. 1-11.
Chanda et al., "Plastics Fundamentals, Properties, and Testing", CRC Press, 2009, pp. 1.86 to 1.87.
Banavali et al., "Tertiary Alkyl Primary Amines as Stabilizers for Middle Distillate Fuels", ACS Division of Energy & Fuels, 1997, pp. 784-788.
Notice of Preliminary Rejection from the Korean Intellectual Property Office, dated Jan. 21, 2020.
Brief Communication, European Patent Office, Mar. 3, 2020.
Canning, Gregory William, "Soft X-Ray Spectroscopic Studies of Surface Films from Oil Additives", University of Western Ontario, Dec. 1998, pp. 1-95, London Ontario.
Van Rensselar, Jean, "Trends in Industrial Gear Oils", http://www.gearsolutions.com/article/detail/5490/motion-impossible-without-the-right-lube, Feb. 2013, pp. 26-33, STLE.org, Detroit U.S.A.
Mang, Theo; Bobzin, Kirsten & Bartels, Thorsten, "Industrial Tribology: Tribosystems, Friction, Wear and Surface Engineering, Lubrication" Jan. 2011, pp. 357-362 Wiley-VCH verlag & Co. KGaA, Weinheim, Germany.
Mortier, R.M.; Fox, M.F. & Orszulik, S.T., "Chemistry and Technology of Lubricants", 2010, pp. 268-269 & 285-287, Springer Science-Business Media B.V., London, New York.

* cited by examiner

LUBRICANTS WITH IMPROVED SEAL COMPATIBILITY

FIELD OF THE INVENTION

The present invention relates to lubricating compositions and particularly gear oil compositions that include a specific class of substituted triazoles, where the substituted triazole includes at least one hydrocarbyl group linked to one of the nitrogen atoms in the triazole ring. Such compositions provide surprisingly good seal compatibility compared to compositions with other triazoles and/or alternative additives.

BACKGROUND OF THE INVENTION

In many industrial applications lubricating compositions come into contact with seals within the equipment in which they are used. Seals are made out of various materials, including nitrile-butadiene rubber (NBR) due to its relatively low cost and high availability, as well as fluorinated elastomers, silicones, and polycarbonates. It is essential that the lubricating composition used has good compatibility with the seals otherwise seals are degraded over time to the point that they fail, leading to fluid leakage increasing maintenance costs, longer down time for the equipment, and even the risk of equipment damage.

Seals, particularly those made using NBR, break down over time under even normal operating conditions. High temperatures in particular can be very detrimental to some seals. In other cases seals can sometimes be susceptible to attack by chemical additive components of some lubricating compositions, including those used frequently in industrial applications, including some extreme-pressure agents like sulfurized olefins, rust inhibitors like aminic compounds, antiwear agents like phosphates, phosphites, phosphate esters, and phosphate amine salts. In some cases even the base oil itself can attack seal materials including NBR.

There is an on-going need for industrial lubricating compositions that can provide the required performance and protection for the equipment, but which also protect the seals attack or degradation thus reducing the risk of lubricant leakage, down time and ultimately equipment damage or failure.

Wind turbines in particular represent an industrial application that requires lubricating compositions with good seal compatibility. Wind turbines as an alternative renewable energy source are attracting more interest, since they produce electricity by converting clean wind energy to electrical energy. A gear box, which is typically situated between the rotor of the wind turbine and the generator, requires a lubricant. The high torque puts a large amount of stress on the gears and bearings in the gear box of these wind turbines, placing high performance requirements on the lubricating composition. In addition, the gear boxes are located in nacelles of the wind turbine high off the ground and the unit themselves are often in remote areas. Thus the gear boxes are often inaccessible or only accessible with great cost and difficulty such that a long service life with limited maintenance is desired. Lubricating compositions with improved seal compatibility but which still provide good lubricating performance are expected to reduce maintenance and down time caused by failed seals. Thus there is a need for lubricating compositions with improved seal compatibility, that still provide good lubricating performance in wind turbines and similar applications.

SUMMARY OF THE INVENTION

The invention provides a lubricating composition comprising (i) an oil of lubricating viscosity and (ii) a substituted triazole where the substituted triazole includes at least one hydrocarbyl group linked to one of the nitrogen atoms in the triazole ring. In some embodiments the lubricating composition is an industrial lubricating composition, that is a lubricating composition for an industrial application, including for example, wind turbines. Thus in some embodiments the invention provides a wind turbine lubricating composition.

In some embodiments the substituted triazole is present in the lubricating composition from 0.05 to 1.0 percent by weight.

The invention provides for substituted triazoles having the formula:

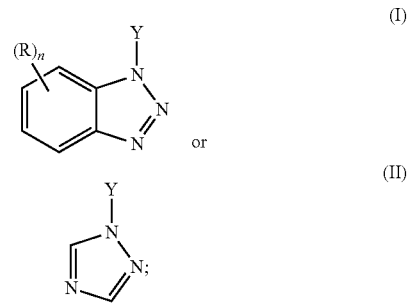

or a combination thereof; where, for both formula I and formula II: n is an integer from 0 to 4; —R is a hydrocarbyl group; —Y is —$R^1$ or —$(R^2)_m$—$NR^3R^3$ where —$R^1$ is a hydrocarbyl group, —$R^2$— is a hydrocarbylene group, m is 0 or 1, and each —$R^3$ is independently hydrogen or a hydrocarbyl group, so long as the —$R^1$, —$R^2$—, and each —$R^3$ overall, including whichever are present, contain from 6, 7, 8 or even 9 up to 40 carbon atoms combined (in other words the ranges here refer to the total number of carbon atoms in the Y group). In some embodiments, when Y is —$R^1$, $R^1$ may contain from 6 or 8 up to 40 carbon atoms, and when Y is —$(R^2)_m$—$NR^3R^3$, the —$R^1$, —$R^2$—, and each —$R^3$ groups overall may contain from 7 or even 9 to 40 carbon atoms combined.

The invention provides for the described compositions where the oil of lubricating viscosity includes a mineral base oil, where the oil of lubricating viscosity includes a synthetic base oil, and even where the oil of lubricating viscosity includes a combination of a mineral base oil and a synthetic base oil. In some embodiments the oil of lubricating viscosity is substantially free of, or even free of, a synthetic ester base oil.

The invention also provides for the compositions containing a substituted triazole where the substituted triazole is the reaction product of a triazole, an aldehyde and an amine.

The invention provides a method of lubricating a gear assembly comprising supplying to said assembly a lubricating composition comprising (i) an oil of lubricating viscosity and (ii) a substituted triazole where the triazole includes at least one hydrocarbyl group linked to one of the nitrogen atoms in the triazole ring. Any of the substituted triazoles described herein may be used in such methods.

The invention provides for the use of the described substituted triazoles in lubricating compositions as a seal protectant, including lubricating compositions for industrial applications. The invention provides even more specifically for wind turbines and other applications that require fatigue or micro-pitting resistant formulations and even applications that have stringent seal compatibility requirements.

DETAILED DESCRIPTION OF THE INVENTION

Various features and embodiments of the invention will be described below by way of non-limiting illustration.

The invention provides a lubricating composition comprising (i) an oil of lubricating viscosity and (ii) a substituted triazole where the substituted triazole includes at least one hydrocarbyl group linked to one of the nitrogen atoms in the triazole ring, as well as methods of using such compositions. The compositions of the present invention may also include one or more additional additives.

The Oil of Lubricating Viscosity

One component of the compositions of the invention is an oil of lubricating viscosity, which can be present in a major amount, for a lubricant composition, or in a concentrate forming amount, for a concentrate.

Suitable oils include natural and synthetic lubricating oils and mixtures thereof. In a fully formulated lubricant, the oil of lubricating viscosity is generally present in a major amount (i.e. an amount greater than 50 percent by weight). Typically, the oil of lubricating viscosity is present in an amount of 75 to 95 percent by weight, and often greater than 80 percent by weight of the overall composition. The base oil component generally makes up 100 parts by weight (pbw) of the overall composition with the pbw ranges for the other components being provided with this 100 pbw of base oil in mind. In other embodiments the pbw ranges of the various components, including the base oils, are provided such that the total of the pbw of all components is 100, and thus the pbw values are equivalent to percent by weight values. The pbw ranges provided for the various components described below may be taken either way, however in most embodiments they are to be read so as to be equivalent to percent by weight values.

The oil of lubricating viscosity may include natural and synthetic oils, oil derived from hydrocracking, hydrogenation, and hydrofinishing, unrefined, refined and refined oils or mixtures thereof. Unrefined oils are those obtained directly from a natural or synthetic source generally without (or with little) further purification treatment. Refined oils are similar to the unrefined oils except they have been further treated in one or more purification steps to improve one or more properties. Purification techniques are known in the art and include solvent extraction, secondary distillation, acid or base extraction, filtration, percolation and the like. Re-refined oils are also known as reclaimed or reprocessed oils, and are obtained by processes similar to those used to obtain refined oils and often are additionally processed by techniques directed to removal of spent additives and oil breakdown products.

Natural oils useful as the oil of lubricating viscosity include animal oils, vegetable oils (e.g., castor oil, lard oil), mineral lubricating oils such as liquid petroleum oils and solvent-treated or acid-treated mineral lubricating oils of the paraffinic, naphthenic or mixed paraffinic naphthenic types and oils derived from coal or shale or mixtures thereof.

Synthetic oils of lubricating viscosity include hydrocarbon oils such as polymerized and interpolymerised olefins (e.g., polybutylenes, polypropylenes, propyleneisobutylene copolymers); poly(1-hexenes), poly(1-octenes), poly(1-decenes), and mixtures thereof; alkyl-benzenes (e.g., dodecylbenzenes, tetradecylbenzenes, dinonylbenzenes, di-(2-ethylhexyl)-benzenes); polyphenyls (e.g., biphenyls, terphenyls, alkylated polyphenyls); alkylated biphenyl ethers and alkylated biphenyl sulfides and the derivatives, analogs and homologs thereof or mixtures thereof.

Another synthetic oil of lubricating viscosity includes polyol esters other than the hydrocarbyl-capped polyoxyalkylene polyol as disclosed herein, dicarboxylic esters, liquid esters of phosphorus-containing acids (e.g., tricresyl phosphate, trioctyl phosphate, and the diethyl ester of decane phosphonic acid), or polymeric tetrahydrofurans. Synthetic conventional oil of lubricating viscosity also include those produced by Fischer-Tropsch reactions and typically may be hydroisomerised Fischer-Tropsch hydrocarbons or waxes. In one embodiment, the oil of lubricating viscosity may be prepared by a Fischer-Tropsch gas-to-liquid synthetic procedure as well as other gas-to-liquid oils.

Oils of lubricating viscosity may further be defined as specified in the American Petroleum Institute (API) Base Oil Interchangeability Guidelines. The five base oil groups are as follows: Group I (sulfur content >0.03 wt %, and/or <90 wt % saturates, viscosity index 80-120); Group II (sulfur content ≤0.03 wt % and ≥90 wt % saturates, viscosity index 80-120); Group III (sulfur content ≤0.03 wt % and ≥90 wt % saturates, viscosity index ≥120); Group IV (all polyalphaolefins PAOs such as PAO-2, PAO-4, PAO-5, PAO-6, PAO-7 or PAO-8); and Group V. The oil of lubricating viscosity includes API Group I, Group II, Group III, Group IV, Group V oil or mixtures thereof. In one embodiment, the oil of lubricating viscosity is an API Group I, Group II, Group III, Group IV oil or mixtures thereof. Alternatively, the oil of lubricating viscosity is often an API Group II, Group III or Group IV oil or mixtures thereof.

The various described oils of lubricating viscosity may be used alone or in combinations. The oil of lubricating viscosity is used in the range of about 70 wt % to about 99 wt %, and in another embodiment, in the range of about 75 wt % to about 98 wt %, in another embodiment in the range of about 88 wt % to about 97 wt % of the lubricant.

In some embodiments the lubricating oil component of the present invention includes a Group II or Group III base oil, or a combination thereof. These are classifications established by the API (American Petroleum Institute). Group III oils contain <0.03 percent sulfur and >90 percent saturates and have a viscosity index of >120. Group II oils have a viscosity index of 80 to 120 and contain <0.03 percent sulfur and >90 percent saturates. The oil can also be derived from the hydroisomerization of wax, such as slack wax or a Fischer-Tropsch synthesized wax. Such "Gas-to-Liquid" oils are typically characterized as Group III.

The compositions of the present invention may include some amount of Group I base oils, and even Group IV and Group V base oils. Polyalphaolefins are categorized as Group IV. Group V encompasses "all others". However, in some embodiments the lubricating oil component of the invention contains no more than 20, 10, 5, or even 1 percent by weight Group I base oil. These limits may also apply to Group IV or Group V base oils. In other embodiments the lubricating oil present in the compositions of the invention is at least 60, 70, 80, 90, or even 95 percent by weight Group II and/or Group III base oil. In some embodiments the lubricating oil present in the compositions of the invention is essentially only Group II and/or Group III base oil, where small amounts of other types of base oils may be present but not in amounts that significantly impact the properties or performance of the overall composition.

In some embodiments the compositions of the invention include some amount of Group I and/or Group II base oils. In other embodiments the compositions of the invention are lubricating compositions where the oil of lubricating viscosity is primarily Group I and/or Group II base oils, or even essentially Group I and/or Group II base oils, or even exclusively Group I and/or Group II base oils.

In some embodiments the compositions of the invention include some amount of Group I base oils. In other embodiments the compositions of the invention are lubricating compositions where the oil of lubricating viscosity is primarily Group I base oils, or even essentially Group I base oils, or even exclusively Group I base oils.

In some embodiments the compositions of the invention include some amount of Group II base oils. In other embodiments the compositions of the invention are lubricating compositions where the oil of lubricating viscosity is primarily Group II base oils, or even essentially Group II base oils, or even exclusively Group II base oils.

In some embodiment's the oil of lubricating viscosity may be present in the range from 60 to 99.9, from 88.5 to 99.6, from 96.9 to 99.5, or from 98.2 to 99.4 weight percent of the lubricating oil composition. Each oil of lubricating viscosity described above may be used alone or as mixtures of one or more thereof.

The Substituted Triazole

The lubricating compositions on the invention include a substituted triazole where the substituted triazole includes at least one hydrocarbyl group linked to one of the nitrogen atoms in the triazole ring. The substituted triazole includes substituted benzotriazoles, and in some embodiments the substituted triazole is a substituted benzotriazole. In some of these embodiments the hydrocarbyl group linked to one of the nitrogen atoms in the triazole ring does not contain any oxygen atoms.

In some embodiments the substituted triazole has a single hydrocarbyl group linked to a nitrogen atom on the triazole ring. In some embodiments the substituted triazole contains an aryl group linked and a single hydrocarbyl group linked to a nitrogen atom on the triazole ring.

The hydrocarbyl group of the substituted triazole is considered to be an important feature of the invention. The hydrocarbyl group may be linear or branched, however in some embodiment the hydrocarbyl group is branched. In some embodiments the hydrocarbyl contains at least one nitrogen atom, and in further embodiments the hydrocarbyl contains a single nitrogen atom. In these embodiments, where a nitrogen atom is present, the substituent group is still referred to herein as a hydrocarbyl group. In still further embodiments the hydrocarbyl group: contains a single nitrogen atom, is branched at one or more points, and the nitrogen atom is itself a branch point. In other words, in some embodiments the hydrocarbyl group of the substituted triazole can be described as —$R^1$—$NR^2R^2$ where each $R^1$ is a hydrocarbyl group, and more specifically a hydrocarbylene group, and each $R^2$ is a hydrocarbyl group that contains at least one carbon atoms. In such embodiments the $R^1$ and $R^2$ groups may themselves be linear or branched hydrocarbyl groups. In some embodiments $R^1$ is a linear hydrocarbyl group while both $R^2$ groups are identical branched hydrocarbyl groups.

In any of these described embodiments the hydrocarbyl group linked to one of the nitrogen atoms in the triazole ring may contain from 6 to 40 carbon atoms, or may contain from about 6, 8, 10, 12, 14, or 16 carbon atoms up to 40, 30, 20, or 18 carbon atoms. In some embodiments the hydrocarbyl group contains 16 to 18 carbon atoms and one nitrogen atom.

In some embodiments the hydrocarbyl group linked to one of the nitrogen atoms in the triazole ring is a nitrogen-containing group where the nitrogen atom in the hydrocarbyl group is connected to the nitrogen in the triazole ring by one or two carbon atoms and wherein the nitrogen atom itself, in addition to the connected to the triazole ring, also contains two hydrocarbyl groups which are identical branched alkyl groups containing and in some embodiments contain 6 to 10 carbon atoms each. Examples of suitable branched alkyl groups include 2-methylpentyl, 2-methylhexyl, 3-methylheptyl, 4-methyloctyl, 2-ethylpentyl, 2-ethylhexyl, 3-ethylheptyl, 4-ethyloctyl, 2-propylheptyl, etc.

In some embodiments the substituted triazole may be represented by the following formulas:

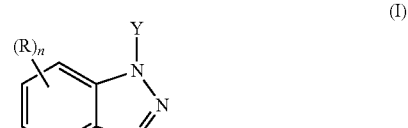

or a combination thereof; where, for both formula I and formula II: n is an integer from 0 to 4; —R is a hydrocarbyl group; —Y is —$R^1$ or —$(R^2)_m$—$NR^3R^3$ where —$R^1$ is a hydrocarbyl group, —$R^2$— is a hydrocarbylene group, m is 0 or 1 or 2, and each —$R^3$ is independently hydrogen or a hydrocarbyl group, so long as the —$R^1$, —$R^2$—, and —$R^3$ overall contain from 7 or even 9 to 40 carbon atoms combined. In some embodiments the substituted triazole of the invention is represented by Formula (I).

In some embodiments: n may be from 0 or 1 up to 4, 3, 2 or 1; R may be a hydrocarbyl group and may contain from 1 to 50 carbon atoms, or from 1 or 2 up to 40, 30, 20, 18 or even 8 carbon atoms, and in some embodiments contains 1 or 2 carbon atoms; within Y, m may be 0 or 1 or 2 and in some embodiments 1 or 2; $R^1$ may be a hydrocarbyl group and may contain from 1, 6, 10 or 12 up to 40, 30, 20, or even 18 carbon atoms; $R^2$ may be a hydrocarbylene group and may contain from 1, 6, 10 or 12 up to 40, 30, 20, 18, or even 8 carbon atoms or even 1 to 8 carbon atoms and in some embodiments contains 1 carbon atom; $R^3$ may be hydrogen or a hydrocarbyl group and may contain from 1, 6, 10 or 12 up to 40, 30, 20, 18, or even 8 carbon atoms or even 1 to 8 carbon atoms and in some embodiments contains 8 carbon atoms, so long as Y contains from 8 to 40 carbon atoms.

In some embodiments —Y is —$R^1$, —$R^2$—NHH, —$R^2$—NHR$^3$, —$R^2$—NR$^3R^3$ where the various R groups can have any of definitions provided above again so long as the Y group contains overall 6 or 7 or even 9 up to 40 carbon atoms.

In some embodiments all of the hydrocarbyl groups described above are free of oxygen atoms. In some embodiments all of the hydrocarbyl groups described above are free of all heteroatoms and are purely alkyl groups except for a single nitrogen atom present in the Y group.

The substituted triazole of the invention may be prepared by condensing a basic triazole via its acidic —NH group with an aldehyde and an amine. In some embodiments the substituted triazole is the reaction product of a triazole, an aldehyde and an amine. Suitable triazoles that may be used to prepare the substituted triazole of the invention include benzotriazole, while suitable aldehydes include formaldehyde and reactive equivalents like formalin, while suitable amines include primary or secondary amines. In some embodiments the amines are secondary amines and further are branched amines. In still further embodiments the amines are beta-branched amines, for examples bis-2-ethylhexyl amine.

The compositions of the invention typically include the substituted triazole from 0.05 to 1.0 percent by weight, but may also include from 0.05 or 0.1 up to 1.0 or 0.5 percent by weight of the substituted triazole. In some embodiments the composition of the invention contains no more than 1, 0.75, or even 0.5 percent by weight substituted triazole. In some embodiments the composition of the invention contains at least 0.05, 0.07, or even 0.1 percent by weight substituted triazole.

Additional Additives

Optionally the lubricating compositions of the invention include one or more additional additives, which may be selected from the group including: a foam inhibitor, a demulsifier, a pour point depressant, an antioxidant other than those described above, a dispersant, a metal deactivator (such as a copper deactivator), an antiwear agent, extreme pressure agent, viscosity modifiers, or mixtures thereof. The optional additives may each be present in the range from 0.0005 to 1.3, from 0.00075 to 0.5, from 0.001 to 0.4, or from 0.0015 to 0.3 percent by weight of the lubricating oil composition. However it is noted that some optional additives, including viscosity modifying polymers, which may alternatively be considered as part of the base fluid, may be present in higher amounts including up to 30, 40, or even 50% by weight when considered separate from the base fluid. The optional additives may be used alone or mixtures thereof.

Antifoams, also known as foam inhibitors, are known in the art and include but are not limited to organic silicones and non-silicon foam inhibitors. Examples of organic silicones include dimethyl silicone and polysiloxanes. Examples of non-silicon foam inhibitors include but are not limited to polyethers, polyacrylates and mixtures thereof as well as copolymers of ethyl acrylate, 2-ethylhexylacrylate, and optionally vinyl acetate. In some embodiments the antifoam is a polyacrylate. Antifoams may be present in the composition from 0.001 to 0.012 or 0.004 pbw or even 0.001 to 0.003.

Demulsifiers are known in the art and include but are not limited to derivatives of propylene oxide, ethylene oxide, polyoxyalkylene alcohols, alkyl amines, amino alcohols, diamines or polyamines reacted sequentially with ethylene oxide or substituted ethylene oxides or mixtures thereof. Examples of demulsifiers include polyethylene glycols, polyethylene oxides, polypropylene oxides, (ethylene oxide-propylene oxide) polymers and mixtures thereof. In some embodiments the demulsifiers is a polyether. Demulsifiers may be present in the composition from 0.002 to 0.012 pbw.

Pour point depressants are known in the art and include but are not limited to esters of maleic anhydride-styrene copolymers, polymethacrylates; polyacrylates; polyacrylamides; condensation products of haloparaffin waxes and aromatic compounds; vinyl carboxylate polymers; and terpolymers of dialkyl fumarates, vinyl esters of fatty acids, ethylene-vinyl acetate copolymers, alkyl phenol formaldehyde condensation resins, alkyl vinyl ethers and mixtures thereof.

The compositions of the invention may also include a rust inhibitor. Suitable rust inhibitors include hydrocarbyl amine salts of alkylphosphoric acid, hydrocarbyl amine salts of dialkyldithiophosphoric acid, hydrocarbyl amine salts of hydrocarbyl arenesulphonic acid, fatty carboxylic acids or esters thereof, an ester of a nitrogen-containing carboxylic acid, an ammonium sulfonate, an imidazoline, mono-thio phosphate salts or esters, or any combination thereof; or mixtures thereof.

Suitable hydrocarbyl amine salts of alkylphosphoric acid of the invention are represented by the following formulas:

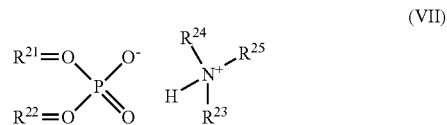

(VII)

wherein $R^{21}$ and $R^{22}$ are independently hydrogen, alkyl chains or hydrocarbyl, and in some embodiments at least one of $R^{21}$ and $R^{22}$ are hydrocarbyl. $R^{21}$ and $R^{22}$ contain about 4 to about 30, about 8 to about 25, or even about 8 or 10 to about 20, or even from 13 to about 19 carbon atoms. $R^{23}$, $R^{24}$ and $R^{25}$ are independently hydrogen, alkyl branched or linear alkyl chains with about 1 to about 30, in other embodiments about 4 to about 24, or even from about 6 to about 20, and in some embodiments about 8 or 10 to about 16 carbon atoms. $R^{23}$, $R^{24}$ and $R^{25}$ are independently hydrogen, alkyl branched or linear alkyl chains, and in some embodiments at least one, or even two of $R^{23}$, $R^{24}$ and $R^{25}$ are hydrogen, and further where at least one of $R^{23}$, $R^{24}$ and $R^{25}$ is a hydrocarbyl group containing at least 8 carbon atoms.

Examples of alkyl groups suitable for $R^{23}$, $R^{24}$ and $R^{25}$ include but are not limited to butyl, sec-butyl, isobutyl, tert-butyl, pentyl, n-hexyl, sec-hexyl, n-octyl, 2-ethyl, hexyl, ethyl-hexyl, decyl, undecyl, dodecyl, tridecyl, tetradecyl, pentadecyl, hexadecyl, heptadecyl, octadecyl, octadecenyl, nonadecyl, eicosyl or mixtures thereof.

In one embodiment the hydrocarbyl amine salt of an alkylphosphoric acid is the reaction product of a $C_{14}$ to $C_{18}$ alkylated phosphoric acid with Primene 81R (produced and sold by Rohm & Haas) which is a mixture of $C_{11}$ to $C_{14}$ tertiary alkyl primary amines.

Hydrocarbyl amine salts of dialkyldithiophosphoric acid of the invention used in the rust inhibitor package are represented by the formula:

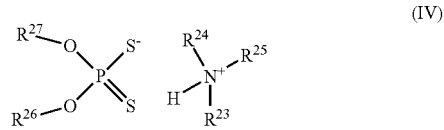

(IV)

wherein $R^{26}$ and $R^{27}$ are independently branched or linear alkyl groups. $R^{26}$ and $R^{27}$ contain about 3 to about 30, preferably about 4 to about 25, more preferably about 5 to about 20, and most preferably about 6 to about 19 carbon atoms. $R^{23}$, $R^{24}$ and $R^{25}$ are as described above.

Examples of hydrocarbyl amine salts of dialkyldithiophosphoric acid of the invention include but are not limited to the reaction product(s) of diheptyl or dioctyl or dinonyl dithiophosphoric acids with ethylenediamine, morpholine or Primene 81R or mixtures thereof.

Suitable hydrocarbyl amine salts of hydrocarbyl arenesulphonic acids used in the rust inhibitor package of the invention are represented by the formula:

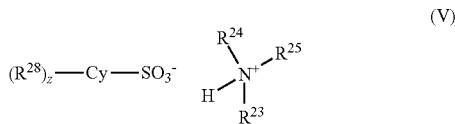

(V)

wherein Cy is a benzene or naphthalene ring. $R^{28}$ is a hydrocarbyl group with about 4 to about 30, preferably about 6 to about 25, more preferably about 8 to about 20 carbon atoms. z is independently 1, 2, 3, or 4 and most preferably z is 1 or 2. $R^{23}$, $R^{24}$ and $R^{25}$ are as described above.

Examples of hydrocarbyl amine salts of hydrocarbyl arenesulphonic acid of the invention include but are not limited to the ethylenediamine salt of dinonylnaphthalene sulphonic acid.

Examples of suitable fatty carboxylic acids or esters thereof include glycerol monooleate and oleic acid. An example of a suitable ester of a nitrogen-containing carboxylic acid includes oleyl sarcosine.

The rust inhibitors may be present in the range from 0.02-0.2, from 0.03 to 0.15, from 0.04 to 0.12, or from 0.05 to 0.1 pbw of the lubricating oil composition. The rust inhibitors of the invention may be used alone or in mixtures thereof.

The lubricating compositions of the invention may also include a metal deactivator. Metal deactivators are used to neutralise the catalytic effect of metal for promoting oxidation in lubricating oil. Suitable metal deactivators include but are not limited to triazoles, tolyltriazoles, a thiadiazole, or combinations thereof, as well as derivatives thereof. Examples include derivatives of benzotriazoles other than those described above, benzimidazole, 2-alkylthiobenzimidazoles, 2-alkyldithiobenzothiazoles, 2-(N,N'-dialkyldithio-carbamoyl)benzothiazoles, 2,5-bis(alkyl-dithio)-1,3,4-thiadiazoles, 2,5-bis(N,N'-dialkyldithiocarbamoyl)-1,3,4-thiadiazoles, 2-alkyldithio-5-mercapto thiadiazoles or mixtures thereof. These additives may be used from 0.01 to 0.25 percent by weight in the overall composition.

In some embodiments the metal deactivator is a hydrocarbyl substituted benzotriazole compound. The benzotriazole compounds with hydrocarbyl substitutions include at least one of the following ring positions 1- or 2- or 4- or 5- or 6- or 7-benzotriazoles. The hydrocarbyl groups contain about 1 to about 30, preferably about 1 to about 15, more preferably about 1 to about 7 carbon atoms, and most preferably the metal deactivator is 5-methylbenzotriazole used alone or mixtures thereof.

The metal deactivators may be present in the range from 0.001 to 0.1, from 0.01 to 0.04 or from 0.015 to 0.03 pbw of the lubricating oil composition. Metal deactivators may also be present in the composition from 0.002 or 0.004 to 0.02 pbw. The metal deactivator may be used alone or mixtures thereof.

Antioxidants may also be present including (i) an alkylated diphenylamine, and (ii) a substituted hydrocarbyl mono-sulfide. In some embodiments the alkylated diphenylamines of the invention are bis-nonylated diphenylamine and bis-octylated diphenylamine. In some embodiments the substituted hydrocarbyl monosulfides include n-dodecyl-2-hydroxyethyl sulfide, 1-(tert-dodecylthio)-2-propanol, or combinations thereof. In some embodiments the substituted hydrocarbyl monosulfide is 1-(tert-dodecylthio)-2-propanol.

The antioxidant package may also include sterically hindered phenols. Examples of suitable hydrocarbyl groups include but are not limited to 2-ethylhexyl or n-butyl ester, dodecyl or mixtures thereof. Examples of methylene-bridged sterically hindered phenols include but are not limited to 4,4'-methylene-bis(6-tert-butyl o-cresol), 4,4'-methylene-bis(2-tert-amyl-o-cresol), 2,2'-methylene-bis(4-methyl-6-tert-butylphenol), 4,4'-methylene-bis(2,6-di-tert-butylphenol) or mixtures thereof.

In some embodiments the compositions of the invention are essentially free of, or even completely free of alkylated phenols, alkaryl amines, or both, or contain them at not more than 2.0 percent by weight, 1.0 percent by weight, or even 0.5 percent by weight where theses percent buy weight values refer to the total amount of alkylated phenols and/or alkaryl amines present in the overall lubricant.

Dispersants may also be present including: (i) a polyetheramine; (ii) a borated succinimide dispersant; (iii) a non-borated succinimide dispersant; (iv) a Mannich reaction product of a dialkylamine, an aldehyde and a hydrocarbyl substituted phenol; or any combination thereof. In some embodiments the dispersant component is present from 0.05 to 0.5 pbw of the overall composition.

The invention further provides for all of the compositions, methods, and uses described herein, where the specified lubricant includes a demulsifier, where the specified lubricant includes a combination of a demulsifier and a sulfurized olefin, where the specified lubricant includes a highly sulfurized olefin such as a sulfurized olefin containing at least 20% by weight sulfur, where the specified lubricant is essentially free or to even completely free of non-highly sulfurized olefins such as a sulfurized olefin containing less than 20% by weight sulfur, where the specified lubricant includes a combination of a substituted triazole and a substituted thiadiazole, where the specified lubricant is essentially free of or even completely free of metal dialkyl dithiophosphates, where the specified lubricant is essentially free of or even completely free of overbased metal-containing detergents, where the specified lubricant is essentially free of or even completely free of zinc, or any combination thereof.

INDUSTRIAL APPLICATION

The invention provides a process for the preparation of lubricating oil compositions. The lubricating oil compositions are prepared by the steps comprising: a) mixing and/or dissolving in one another the components described above that includes the combination of an oil of lubricating viscosity, the substituted triazole and optionally one more addition additives. The materials are mixed until the additives are substantially or wholly dissolved, in some embodiments at elevated temperatures in the range 40° C. to 110° C., or 50° C. to 95° C., or even 55° C. to 85° C.; and for a period of time in the range 30 seconds to 24 hours, 2 minutes to 8 hours, or 5 minutes to 4 hours; and at pressures in the range 700 mm of Hg to 2000 mm of Hg, 750 mm of Hg to 900 mm of Hg, or 755 mm of Hg to 800 mm of Hg.

The order of addition of the additives is not overly limited. The optional additives may be mixed in at the same time as the other components or at a later time using any of the mixing procedures described above.

In some embodiments a portion of oil or similar diluent is present with the components and the components are mixed into the oil. In other embodiments a minimal amount of oil or diluent is present, other than that amount inherently present in the additive from their means of production and preparation and additional base oil is added after the component have been mixed. In any event the described processes results in lubricating compositions.

In some embodiments the lubricating oil compositions may be prepared from a concentrate comprising the steps of: a) mixing all of the components described above with minimal oil and/or diluent present, other than optionally some relatively small amount to allow for reasonable handling properties. The resulting concentrate may then be used in the preparation of a lubricating composition by mixing the concentrate with an effective amount of base oil or mixtures thereof resulting in a finished fluid. Optional additives may be added to the concentrate or to the resulting final fluid. These optional additives include any of those described above. In some embodiments these optional additives include a foam inhibitor, a demulsifier, a viscosity modifier, a pour point depressant, or mixtures thereof, and may be added such that they are present in the overall compositions in the range about 0, 0.01, 0.1 or even 0.25 or up to about 13, 10, 8 or even 6 pbw.

In some embodiments the compositions of the invention have an ISO viscosity grade from 100 to 1000, or from 100 to 460, or even from 100 or 150 to 320. In some embodiments the compositions of this invention are not grease compositions or engine oil compositions. Rather these compositions can be industrial gear oils, wind turbine lubricants, bearing lubricants, and the like, and in some embodiments even automotive gear oils.

SPECIFIC EMBODIMENT

The invention will be further illustrated by the following examples, which set forth particularly advantageous embodiments. While the examples are provided to illustrate the invention, they are not intended to limit it.

The example sets below are designed to evaluate and compare the following additives: Seal Additive A, an alkylated phenol; Seal Additive B, an alkaryl amine; Seal Additive C, a substituted benzotriazole which may be prepared by reacting tolytriazole with an aldehyde and 2-ethylhexyl amine; and Seal Additive D, a substituted triazole which may be prepared by reacting triazole with an aldehyde and 2-ethylhexyl amine. Seal Additives A and B do not meet the requirements for the substituted triazole of the invention.

To evaluate the additives, the examples in the example sets below are tested to evaluate their seal compatibility. Using SRE-NBR-28 seals the samples are tested for approval under the DIN 51517-3 gear oil specification (DIN), which involves 100 hours of testing at 100° C. for each sample. Under this specification, the fluid must give a percent tensile decrease of no more than 30% (−30% max) and a percent elongation decrease of no more than 40% (−40% max). Using NBR 902 seals the samples are also tested for approval under the Flender-Siemens specification (F-S) for wind turbines, which involves 1000 hours of testing at 130° C. for each sample. Under this specification, ideally the fluid must give results including a hardness change of not more than 5 points (−5 to +5), a percent volume change from a 2% decrease to a 5% increase (−2% to +5%), a percent tensile decrease of no more than 60% (−60% max) and a percent elongation decrease of no more than 60% (−60% max). These specifications, in particular the Flender-Siemens specification, are very hard to meet, and a relative improvement in performance over a conventional comparative example, even if not a clean pass, would still be considered to be a significant improvement. In fact, a sample that meets the specification expect for having a hardness change up to +7, a volume change up to +6%, or a elongation change of down to −65% is still considered to have met the a specification and passed the test, so long as only one of these areas is outside the normal pass range. This secondary allowance for one of the ratings allows for a passing result even if the sample did not show a "clean pass" with all ratings inside the ideal ranges.

However, as is evident from the results, it is important to consider relative performance of the examples rather than just the pass fail result. When considering the Flender-Siemens specification (F-S) results of the example sets and comparing the relative performance it can be helpful to consider the degree to which a sample passed or failed. The following key can be used for this purpose with the best result at the top of the table and the worst result at the bottom:

| Result Key for Relative Performance Comparisons | |
|---|---|
| Degree Rating | Description of the Rating |
| A PASS | Clean Pass, no ratings outside the ideal ranges. |
| B PASS | Pass, one rating outside the ideal range but within the secondary allowance, discussed in the description of the test method above. |
| F1 | $1^{st}$ Degree Fail, the sample failed for having two ratings outside the ideal ranges but both within the secondary allowances. |
| F2 | $2^{nd}$ Degree Fail, the sample failed for having one rating outside the both ideal range and the secondary allowances for that rating. |
| F3 | $3^{rd}$ Degree Fail, the sample failed for having one rating outside both the ideal range and the secondary allowances for that rating and also having another rating outside the ideal ranges but within the secondary allowances. |
| F4 | $4^{th}$ Degree Fail, the sample failed for having two ratings outside the both ideal range and the secondary allowances for those ratings. |
| F5 | $5^{th}$ Degree Fail, the sample failed for having two ratings outside the both ideal range and the secondary allowances for those ratings and also having a third rating outside the ideal ranges but within the secondary allowances. |
| F6 | $5^{th}$ Degree Fail, the sample failed for having three ratings outside the both ideal range and the secondary allowances for those ratings and also having a third rating outside the ideal ranges but within the secondary allowances. |

Example Set 1

A set of examples is prepared in a Group I (GI) base oil. Each of the examples contains the same conventional additives package in the same amount, such that the sample is suitable for use as a lubricant in industrial gear applications. Each sample is top-treated with one of the Seal Additives described above to see the impact the added materials have on the formulation's performance, specifically in regards to seal compatibility.

The conventional additive package used in each of these examples, is referred to as Additive Package A and contains a metal deactivator, a demulsifier, a rust inhibitor, a mixture of antiwear and extreme pressure agents, an antifoam agent, a detergent, and a corrosion inhibitor. None of the additives in Additive Package A meet the requirements for the substituted triazole of the invention.

The samples are tested to evaluate their seal compatibility using the same test methods described above. The results from the testing of Example Set 2 are summarized in the table below:

TABLE 1

Summary of Results from Example Set 1

|  | Ex 1-1 | Ex 1-2 | Ex 1-3 | Ex 1-4 | Ex 1-5 | Ex 1-6[1] | Ex 1-7 | Ex 1-8[1] | Ex 1-9 | Ex 1-10 |
|---|---|---|---|---|---|---|---|---|---|---|
| Ex Type | Com | Inv | Inv | Inv | Inv | Com | Inv | Com | Inv | Inv |
| Base Oil | GI | GI | GI | GI | GI | GI | GI | GI | GI | GI |
| Add Pack | A | A | A | A | A | A | A | A | A | A |
| Seal Add A | 0 | 0 | 0 | 0 | 0.2 | 0.5 | 0.5 | 1.0 | 1.0 | 0 |
| Seal Add B | 0 | 0 | 0 | 0 | 0.2 | 0.5 | 0.5 | 0 | 0 | 1.0 |
| Seal Add C | 0 | 0.1 | 0.3 | 0.5 | 0.5 | 0 | 0.5 | 0 | 0.5 | 0.5 |
| Seal Add D | 0 | 0 | 0 | 0 | 0 | 0 | 0 | 0 | 0 | 0 |
| F-S Key | F1 | B PASS | A PASS | A PASS | A PASS | F4 | A PASS | F2 | A PASS | A PASS |
| Hardness Δ | 6 | 6 | 3 | 3 | 2 | 7.5 | 2 | 8.5 | 2 | 2 |
| % Vol Δ | 3 | 3 | 4 | 5 | 4 | 3 | 5 | 2.2 | 5 | 5 |
| % Tensile Δ | −5 | −4 | −7 | −6 | −5 | 3.4 | −5 | 6.1 | −5 | −5 |
| % Elong Δ | −61 | −57 | −39 | −32 | −18 | −68 | −14 | −71 | −21 | −21 |

[1] Example 1-6 and Example 1-8 were each tested twice in two different labs. The results shown for these samples is the average of the two results obtained for each.

The results show that the inventive examples provide improved seal compatibility in Group I based formulations over the compositions that include a conventional seal protectant.

Example Set 2

A set of examples is prepared in a Group II (GII) base oil. Each of the examples contains the same conventional additives package described above in Example Set 1. The samples are tested to evaluate their seal compatibility using the same test methods described above. The results from the testing of Example Set 2 are summarized in the table below:

TABLE 2

Summary of Results from Example Set 2

|  | Ex 2-1 | Ex 2-2 | Ex 2-3 | Ex 2-4 | Ex 2-5[1] | Ex 2-6 | Ex 2-7 |
|---|---|---|---|---|---|---|---|
| Ex Type | Com | Inv | Inv | Inv | Com | Inv | Inv |
| Base Oil | GII | GII | GII | GII | GII | GII | GII |
| Add Pack | A | A | A | A | A | A | A |
| Seal Add A | 0 | 0 | 0 | 0 | 1.0 | 1.0 | 0 |
| Seal Add B | 0 | 0 | 0 | 0 | 0 | 0 | 1.0 |
| Seal Add C | 0 | 0.1 | 0.3 | 0.5 | 0 | 0.5 | 0.5 |
| Seal Add D | 0 | 0 | 0 | 0 | 0 | 0 | 0 |
| F-S Key | F3 | B PASS | A PASS | A PASS | F3 | B PASS | B PASS |
| Hardness Δ | 7 | 6 | 5 | 4 | 7 | 4 | 3 |
| % Vol Δ | 2 | 2 | 4 | 5 | 3 | 6 | 6 |
| % Tensile Δ | −1 | −1 | −3 | −8 |  | −7 | −8 |
| % Elong Δ | −72 | −52 | −36 | −30 | −72 | −26 | −27 |

[1] A tensile result was not reported for Example 2-5. However, given the results in the other parameters, it is clear this example failed the test.

The results show that the inventive examples provide improved seal compatibility in Group II based formulations over the compositions that include a conventional seal protectant.

Example Set 3

A set of examples is prepared in a synthetic base oil chosen for use in wind turbine (WT) applications. Each of the examples contains the same conventional additives package in the same amount, such that the sample is suitable for use as a lubricant in industrial gear applications. Each sample is top-treated with an additional additive to see the impact the added materials have on the formulation's performance, specifically in regards to seal compatibility.

The conventional additive package used in each of these examples, is referred to as Additive Package B and contains a mixture of antiwear agents, a mixture of rust inhibitor, a demulsifier, a mixture of antifoam agents, a corrosion inhibitor, and a copper deactivator. None of the additives in Additive Package B meet the requirements for the substituted triazole of the invention.

The samples are tested to evaluate their seal compatibility using the same test methods described above. The results from the testing of Example Set 3 are summarized in the table below. For this sample set in particular, one cannot look at the final pass and fail results, but rather must consider the impact on the individual ratings to see the improvements provided by the present invention. DIN results were also collected for this sample set which also show the improvement the invention provides.

TABLE 3

Summary of Results from Example Set 3

|  | Ex 3-1[1] | Ex 3-2 | Ex 3-3 | Ex 3-4 | Ex 3-5 | Ex 3-6 | Ex 3-7[1] | Ex 3-8 | Ex 3-9 | Ex 3-10 | Ex 3-11 |
|---|---|---|---|---|---|---|---|---|---|---|---|
| Ex Type | Com | Inv | Inv | Inv | Inv | Inv | Inv | Inv | Inv | Inv | Inv |
| Base Oil | WT | WT | WT | WT | WT | WT | WT | WT | WT | WT | WT |

TABLE 3-continued

Summary of Results from Example Set 3

| | Ex 3-1[1] | Ex 3-2 | Ex 3-3 | Ex 3-4 | Ex 3-5 | Ex 3-6 | Ex 3-7[1] | Ex 3-8 | Ex 3-9 | Ex 3-10 | Ex 3-11 |
|---|---|---|---|---|---|---|---|---|---|---|---|
| Add Pack | B | B | B | B | B | B | B | B | B | B | B |
| Seal Add A | 0 | 0 | 0 | 0 | 0.5 | 0.5 | 0.5 | 0.5 | 1.0 | 1.0 | 1.0 |
| Seal Add B | 0 | 0 | 0 | 0 | 0.5 | 0.5 | 0.5 | 0.5 | 1.0 | 1.0 | 1.0 |
| Seal Add C | 0 | 0.1 | 0.25 | 0.5 | 0.1 | 0.25 | 0.5 | 1.0 | 0.1 | 0.25 | 0.5 |
| Seal Add D | 0 | 0 | 0 | 0 | 0 | 0 | 0 | 0 | 0 | 0 | 0 |
| DIN Spec[2] | | | | | | | | | | | |
| % Tensile Δ | −30.8 | −17.7 | −18.6 | −9.4 | −21.2 | −9.7 | −8.1 | −8.3 | −20.4 | −16.9 | −6.6 |
| % Elong Δ | −47.6 | −40.5 | −29.9 | −19.2 | −33.7 | −17.5 | −10.9 | −14.3 | −32.7 | −27.7 | −8.4 |
| F-S Key | B PASS | A PASS | A PASS | B PASS | A PASS | B PASS | F2 | F4 | B PASS | B PASS | F2 |
| Hardness Δ | 6.5 | 5 | 4 | 2 | 4 | 3 | 1 | −3 | 3 | 2 | 0 |
| % Vol Δ | 2.6 | 4 | 5 | 7 | 5 | 6 | 8.4 | 8 | 6 | 7 | 9 |
| % Tensile Δ | −1.9 | −7 | −9 | −16 | −7 | −13 | −9.2 | −25 | −9 | −14 | −19 |
| % Elong Δ | −58 | −55 | −50 | −39 | −55 | −48 | −22 | −19 | −54 | −45 | −35 |

[1]Example 3-1 and Example 3-7 were each tested twice in two different labs. The results shown for these samples is the average of the two results obtained for each.

The results show that the inventive examples provide improved seal compatibility in synthetic formulations designed for wind turbines over the compositions that include a conventional seal protectant, at least when one considers the individual ratings, particularly the change in elongation.

Example Set 4

A set of examples is prepared in a synthetic base oil chosen for use in wind turbine (WT) applications. Each of the examples contains the same conventional additives package described above in Example Set 3. The samples are tested to evaluate their seal compatibility using the same test methods described above. The results from the testing of Example Set 4 are summarized in the table below:

TABLE 4

Summary of Results from Example Set 4

| | Ex 4-1[1] | Ex 4-2[2] | Ex 4-3 |
|---|---|---|---|
| Ex Type | Com | Inv | Inv |
| Base Oil | WT | WT | WT |
| Add Pack | B | B | B |
| Seal Add A | 0 | 0 | 0 |
| Seal Add B | 0 | 0 | 0 |
| Seal Add C | 0 | 0.5 | 0 |
| Seal Add D | 0 | 0 | 0.5 |
| DIN Spec[2] | | | |
| % Tensile Δ | −31 | −9 | −4 |
| % Elong Δ | −48 | −19 | −4 |
| F-S Spec | | | |
| Hardness Δ | 6.5 | 2 | 8 |
| % Vol Δ | 2.6 | 7 | 4 |
| % Tensile Δ | −1.9 | −16 | 5 |
| % Elong Δ | −58 | −39 | −69 |

[1]Example 4-1 is identical to Example 3-1; it is repeated here in this example set for comparison purposes.
[2]Example 4-2 is identical to Example 3-4; it is repeated here in this example set for comparison purposes.

The results show that the inventive examples provide improved seal compatibility in synthetic formulations designed for wind turbines over the compositions that include a conventional seal protectant, at least when one considers the individual ratings, particularly the DIN results.

While the invention has been explained, it is to be understood that various modifications thereof will become apparent to those skilled in the art upon reading the specification. Therefore, it is to be understood that the invention disclosed herein is intended to cover such modifications as fall within the scope of the appended claims.

In this specification the terms "hydrocarbyl substituent" or "hydrocarbyl group," as used herein are used in their ordinary sense, which is well-known to those skilled in the art. Specifically, they refer to a group primarily composed of carbon and hydrogen atoms that is attached to the remainder of the molecule through a carbon atom and does not exclude the presence of other atoms or groups in a proportion insufficient to detract from the molecule having a predominantly hydrocarbon character. In general, no more than two, preferably no more than one, non-hydrocarbon substituent will be present for every ten carbon atoms in the hydrocarbyl group; typically, there will be no non-hydrocarbon substituents in the hydrocarbyl group. A more detailed definition of the terms "hydrocarbyl substituent" or "hydrocarbyl group," is described in U.S. Pat. No. 6,583,092.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent and formulation values listed herein are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration.

What is claimed is:

1. A method of improving the seals compatibility of an industrial gear lubricating composition comprising an oil of lubricating viscosity; and a sulfurized olefin containing at least 20 wt % sulfur by adding to said industrial gear lubricating composition 0.05 to 1.0 percent by weight of a substituted triazole that is the reaction product of a triazole, an aldehyde, and a beta-branched amine and has the formula:

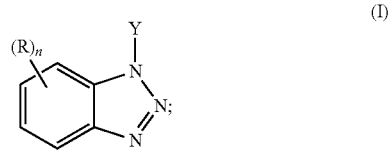

where, n is an integer from 0 to 4;
—R is a hydrocarbyl group;
—Y is $(R^2)_m$—$NR^3R^3$ where,
  —$R^2$— is a hydrocarbylene group containing 1 to 2 carbon atoms, m is 0 or 1, and
  both —$R^3$ groups are branched alkyl groups containing 6 to 20 carbon atoms,
  so long as the sum of carbon atoms in —$R^2$ and —$R^3$ is from 7 to 40 combined.

2. The method of claim 1 wherein the oil of lubricating viscosity comprises a mineral base oil.

3. The method of claim 1 wherein the oil of lubricating viscosity comprises a synthetic base oil.

4. The method of claim 1, wherein the industrial gear lubricating composition further comprises: an antiwear agent, an extreme pressure agent, a friction modifier, a corrosion inhibitor, a rust inhibitor, a metal deactivator, a borated dispersant, a non-borated dispersants, detergent, an antifoam, a viscosity index improver, a viscosity modifier, an additional antioxidant, a pour point depressant, a seal swell agent, or any combination thereof.

5. The method of claim 1, wherein the substituted triazole is present in the lubricating composition from 0.1 to 1.0 percent by weight, based on a total weight of the lubricating composition.

6. The composition of claim 1, wherein the beta-branched amine is bis-2-ethylhexylamine.

* * * * *